March 28, 1939. H. CAVE 2,152,429
BATHTUB FIXTURE
Filed Feb. 23, 1937
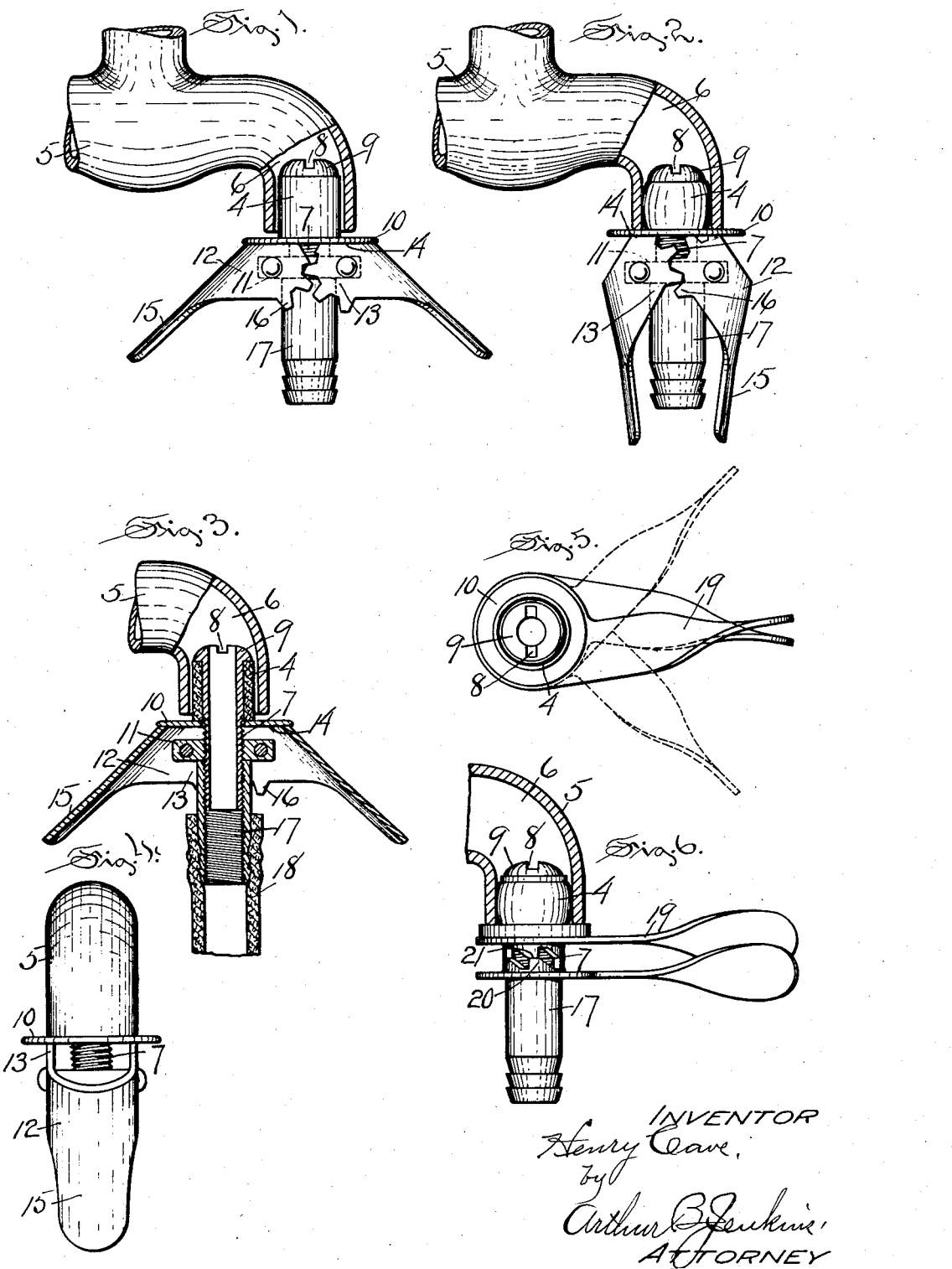

Patented Mar. 28, 1939

2,152,429

UNITED STATES PATENT OFFICE 2,152,429

BATHTUB FIXTURE

Henry Cave, Hartford, Conn., assignor to The Fuller Brush Company, Hartford, Conn., a corporation of Connecticut Application February 23, 1937, Serial No. 126,976

5 Claims. (Cl. 285—165)

My invention relates to that class of devices which may be secured in openings for various purposes, as for attachment of hose to bathtub faucets and similar outlets, and an object of my invention, among others, is to provide an attachment for this purpose that may be readily adapted to fit in the openings of faucets of various sizes.

One form of a fixture embodying my invention and in the construction and use of which the objects herein set out, as well as others, may be attained is illustrated in the accompanying drawing in which Figure 1 is a side view of the fixture showing the parts in unfastened condition.

Figure 2 is a side view of a portion of a faucet with my improved fixture securely fastened thereto.

Figure 3 is a view in axial section through the fixture showing the plug in released condition.

Figure 4 is a view looking at the front of the faucet with my improved device attached thereto.

Figure 5 is a top plan view showing a little different form of the device.

Figure 6 is a view illustrating this latter form attached to a faucet.

While my invention is peculiarly adaptable for the purpose of securing hose to bathtub faucets, the outlet openings of which vary in size, yet, I contemplate a varied use thereof in which it may be secured in openings for various purposes, even to the extent of serving as a plug or stopper for such openings, and I therefore do not limit my invention solely to the purpose for attachment of hose or tubing to faucets, such an illustration having been selected by me for the purpose of disclosure of my invention herein simply for the reason that it finds ready adaptation for such purpose.

In the accompanying drawing the numeral 5 denotes a portion of a faucet having an outlet opening 6 for the delivery of fluid from the faucet. The numeral 7 denotes a support, herein shown as a tubular screw, slotted at 8 as desired for operation as by a key or screw driver. A rubber sleeve or plug 4 is placed on this support for compression against the head 9 of said sleeve or plug as by means of a washer 10 located opposite said head.

An expanding lever support 11 is threaded on to the screw threaded support, and plug expanding levers 12 are pivotally mounted on said support. These levers are each preferably formed with ears located on opposite sides of the support 11 to substantially enclose it. Each lever has a cam 14 formed on one end, and on the opposite end said levers have the shapes of thumb pieces 15.

Interengaging teeth 16 are formed on the ears 13 so that when either lever is swung on its pivot both levers will be operated.

A nipple 17 is screw threadedly engaged with the support 7 and is adapted to engage the support 11 and act as a lock to prevent the latter from turning. This nipple is formed on its end with ribs and grooves for engagement therewith of a tube 18 for delivery of fluid from the faucet 5.

In the operation of the device the levers 12 are located in their unfastening positions as shown in Figs. 1 and 3 of the drawing, and the support 11 is screwed on to the support 7 until the sleeve 4 is expanded to fit within the opening 6 of the faucet 5. The levers 12 now being closed to their fastening positions as shown in Fig. 2, the sleeve 4 will be further expanded to tightly engage the wall of the opening 6 and secure the fixture in place. When the support 11 has been positioned to cause the sleeve to fit the opening in the faucet the nipple 17 may be screwed tightly to place to lock the support 11 in place.

In the form of the device shown in Fig. 5 the support 7, the sleeve 4, and the nipple 17 are formed as hereinbefore described. The expanding levers, however, are provided with openings through which the support extends, the levers extending laterally of the support.

These levers 19 are provided with interengaging cam teeth 20 on their facing surfaces which, when the levers are closed together, cause the sleeve 4 to be expanded to tight engagement with the opening in the faucet, as hereinbefore explained. In this form of the device the nipple 17 may be employed to effect expansion of the sleeve to loosely fit the opening in the faucet, and then when the levers are closed together further expansion of the sleeve will cause the fixture to be tightly held in place.

As hereinbefore mentioned the device may be employed as a plug to stop an opening, in which case the hole through the support 11 would be omitted and the nipple in such case would be employed simply as a locking or positioning member for the expanding levers.

In that form of the device shown in Figs. 5 and 6 the preliminary fitting of the sleeve 4 to the faucet opening is done when the levers 19 are separated and the teeth of each lever are in the spaces between the teeth of the opposite lever, the nipple 17 being screwed up to effect this purpose. Now when the levers are closed together the teeth on each lever riding up the cams on the teeth on the opposite lever will separate the levers until the ends of the teeth on each lever ride on the flat ends 21 of the teeth on the opposite lever, in which position the levers will be closed together, thereby stopping their clamping action.

I claim:

1. A fixture including a threaded support, an expansible member mounted on said support, an expanding lever support rotatably mounted on said threaded support, an expanding lever pivotally mounted on said lever support and having a skirt surrounding and housing said lever support at its end which is adapted to receive a hose, and means on said lever for expanding said member to secure it in place.

2. A fixture including a threaded support, an expansible member mounted on said support, an expanding lever support screw threadedly engaged with the first mentioned support, an expanding lever pivotally mounted on said lever support and having a cam for expanding said member, and a nipple threaded on said support to engage said lever support and afford a lock therefor.

3. A fixture including a threaded support, an expansible member mounted on said support, an expanding lever support screw threadedly engaged with said first mentioned support, a pair of expanding levers pivotally mounted on said lever support and having toothed engagement one with the other to effect an even expansion of said expansible member all around it, and a cam on said lever to expand said expanding member.

4. A fixture including a support, an expansible member mounted on said support, an expanding lever mounted to swing on the axis of said support, a nipple screw threadedly engaged with said support to adjustably position said lever, said nipple extending beyond the end of the support to receive a hose, a cam on said lever, and means cooperating with said cam to move said lever to expand said member.

5. A fixture including a support, an expansible member mounted on said support, a pair of levers mounted to swing on the axis of said support and having interengaging cam teeth to effect movement of a lever to expand said member, and a nipple screw threadedly engaged with said support to adjustably position it to oppose the thrust of said levers.

HENRY CAVE.